July 3, 1934.  J. R. CURTIS  1,965,491
ROCK DRILL
Filed March 23, 1932
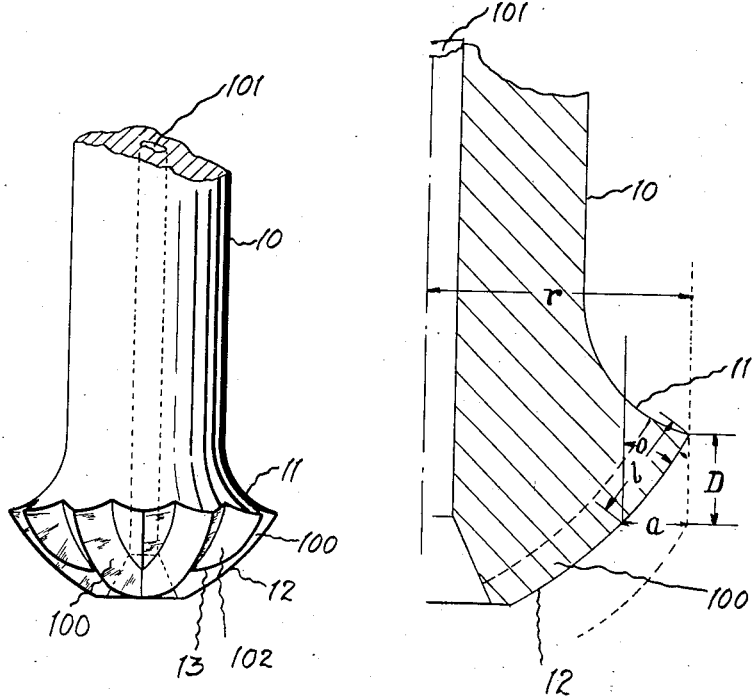
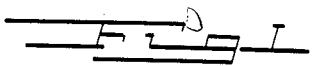
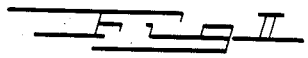
INVENTOR
JOSEPH R. CURTIS
By Emil Bönneljcke
ATTORNEY Patented July 3, 1934

1,965,491

UNITED STATES PATENT OFFICE 1,965,491

ROCK DRILL

Joseph Robbins Curtis, Crown Mines, Johannesburg, Union of South Africa

Application March 23, 1932, Serial No. 600,807
In Great Britain January 14, 1932

5 Claims. (Cl. 255—63)

This invention consists in improvements in or relating to rock-drills and like tools and refers particularly to improvements in the formation of drill-steels for such tools.

In the usual type of cruciform drill-bit the cutting edges lie in a plane perpendicular to the axis of the bit. The burden of excavation borne by each such edge at any point along its length varies with the distance of such point from the axis of the bit. The extremity of the cutting edge remote from the axis and the portion of the edge in the region of that extremity has not only to excavate the greatest amount of rock or material operated upon but has to perform its excavation in the most difficult position, i. e. against the wall of the hole standing at right angles to the face that is being cut. Moreover, it is at this portion of the cutting edge that the greatest amount of wear is experienced due to rotation of the bit. An object of the invention is to reduce the amount of work done per unit length by the portions of the cutting edges remote from the axis of the bit and the wear on those portions.

According to the present invention, the cutting edges of the bit are inclined to the axis thereof, at an angle other than a right angle. Conveniently, the edges are inclined outwardly and rearwardly from the cutting face of the bit and are preferably, considered in a cross-section containing the axis of the bit, convexly curved or arcuate edges.

Preferably, the cutting edge is inclined outwardly and rearwardly, and the inclination to the axis of portions of the edge farthest from the axis is less than the inclination of portions nearer to the axis of the bit.

By thus inclining the cutting edges with respect to the axis relatively less burden of excavation per unit length of the cutting edge will be imposed on the outer portion of that edge and that portion is allowed to cut at a more favourable angle to the wall of the hole than is the case with the ordinary drill-bit above mentioned. When cutting at a more favourable angle there will be a tendency for the bit to cut a hole of greater diameter than that of the bit itself thus lessening the wear on the outer extremities of the cutting edges.

In order still further to lessen the burden of excavation on the outer portions of the cutting edges a drill-bit has, according to the present invention, a number of cutting edges in excess of the number usually employed. Broadly, this feature of the invention comprises a drill-bit having more than six cutting edges.

Since the number of cutting edges which can in practice extend right to the inner periphery of the bit, is limited, some of the cutting edges may extend only part of the way from the outer to the inner periphery of the bit. Under these circumstances, there will be a greater number of cutting edges at the outer periphery where the burden is greatest than at the inner periphery where the burden is least.

The number of blows struck by the bit in any given time is comparatively large and may easily be 1500 or more per minute. Such a drill may advance in hard rock at an average rate of 0.004 inches per blow and if, for example, it should require 10 blows to remove a layer of uniform thickness from the bottom of the hole the advance of the drill will only be, under the conditions postulated above, 0.04 inches. If the blows occur successively after equal increments of rotation of the bit it will be quite customary for the blows from any one cutting edge (to be made at the outer extremity of a bit of 1¼ inches diameter) to be approximately 0.1 inches apart. Under such or similar conditions it will be clear that the size of the rock particles produced in the drilling operation will on the average be very small as compared with the spaces between the blades on which the cutting edges are formed. While, therefore, comparatively large rock particles may be chipped from the rock these will be the exception rather than the rule and they will subsequently be crushed to a size that will easily pass through much narrower spaces or sludge passages than those usually provided between the blades. Consequently, if the number of the cutting edges and consequently the number of blades be increased in accordance with the last-described feature of the present invention ample room will still be provided for the escape of sludge and in the case of a hollow drill steel with water flowing through it, the velocity of the sludge passing through the passages will be increased owing to the narrowing of the passages. This fact, and also the fact that the passages may be shaped on an easy curve will facilitate the discharge of the sludge. It is desirable that the number of cutting edges and blades should be as large as possible because the nearer two adjacent edges lie to one another the more likely is it that rock will be chipped between them rather than crushed under them. But their number and the consequent space between them must be determined by the hardness of the rock and the rapidity of the advance.

Referring again to the inclination of the cutting edges, it is preferred that each edge should be so shaped that the volume excavated per unit length by portions of a cutting edge farthest from the axis is not substantially greater than that excavated per unit length by portions nearer to the axis substantially in accordance with the calculations given herein.

The bit (i. e. the cutting edges) may be forged on the end of the stem of the steel or it may be formed separately from the stem of a drill steel with a recess in its rear face, and secured thereto with the end of the stem in said recess (e. g. by shrinking or jamming in a taper).

In the accompanying drawing,

Figure 1 is a side view of a bit in accordance with the invention;

Figure 2 is a half vertical section of the bit, drawn to an enlarged scale.

Figure 1 shows a drill steel 10 terminating in a bit 11. On the outer surface of said bit are formed a number of wings 100. Each wing is of V section terminating outwardly in a cutting edge 12 which is, in end view, radial to the axis of the bit. The sides of the V are substantially equilateral so that the edges 12 are properly disposed for breaking rock by percussion applied axially to the drill, as in the case of the usual cruciform rock drills. The wings 100 and their cutting edges 12 extend from the outer periphery of the bit, and either to the axis thereof in the case of a solid drill or to the axial hole 101 in the hollow drill illustrated. 102 indicates further wings with cutting edges 13, which are similar to the wings 100 and cutting edges 12 except that they terminate short of the axis or the axial hole 101 as the case may be. The bit shown in this figure is forged on the end of the steel.

Considerations effecting the shape of the cutting edges may be investigated in conjunction with Figure 2. In this figure, $l$ represents an elementary length of a cutting edge, $\theta$ the angle that the elementary length makes with a line passing through the edge and parallel to the axis of the drill, and $r$ the distance of the farthest end of the elementary length from the drill axis. In the case of a bit with four cutting edges the volume excavated by the length $l$ in penetrating to a depth D is:—

$$V = \frac{\pi D}{4}(r^2 - (r-a)^2) = \frac{\pi D}{4}(2ra - a^2)$$

or as $a = l \sin \theta$ $$V = \frac{\pi D}{4}(2rl \sin \theta - l^2 \sin^2 \theta)$$

let $$l = \frac{1}{100} \text{ inch,}$$

D and $r$ being measured in inches, then $$V_1 = \frac{\pi D}{40000}(200r \sin \theta - \sin^2 \theta)$$

or $$V_1 = K(200r \sin \theta - \sin^2 \theta)$$

where $$K = \frac{\pi D}{40000}$$

Considering first the case where the cutting edge lies in a plane perpendicular to the drill axis, then $\theta = 90°$ and $V_2 = K(200r - 1)$.

For the inner element of the cutting edge we may take $r$ as equal to 0.1 inch or $$V_3 = K(20 - 1) = 19K$$

If the hole being drilled is 1 inch diameter the value of $r$ for the outer element will be 0.5 inch, and $$V_4 = K(100 - 1) = 99K$$

i. e. the outer element has over five times the burden of the inner element.

If in the case of the outer elementary length $\theta$ is made 30°, $r$ remaining at 0.5 inch, the volume excavated is reduced to $$V_5 = K(200 \times 0.5 \times 0.5 - 0.25) = 49.75K$$

or about one half of $V_4$. To reduce the burden to that of the inner element $V_3$, $\theta$ must be reduced to about 11° in which case $$V_6 = K(200 \times 0.5 \times 0.191 - 0.036) = 19.06K$$

With the angle $\theta$ at as low a value as 11° trouble might be experienced with the drill sticking in the hole, but when the number of cutting edges in the outer portion of the drill is increased $\theta$ may be correspondingly larger, e. g. if in the case under consideration the outer cutting edges are increased from 4 to 11, $\theta$ may be 30°, and the burden on the outer elements will be less than that on the inner elements.

$$V_7 = \frac{4V_5}{11} = 18.09K$$

It will thus be seen that, taking an annular area of the bit towards the periphery of a radial width $a$ and another area of the same radial width nearer the centre of the drill, it is possible without excessively diminishing the angle $\theta$ and by appropriately increasing the number of cutting edges towards the periphery, to make the total length of the cutting edges enclosed in such outer area proportionate to the length of those in the inner area in the ratio of the mean diameters of said areas, so that the density of the cutting edges is equalized over the area of the bit and the cutting burden per unit of length of all said edges is substantially equal.

It is evident therefore that while in general it may not be practical to make the outer and inner elements of the cutting edges do exactly the same amount of excavation the approximation thereto may be sufficiently close to distinctly improve drilling operations.

This is preferable to forming the recess in the stem since it avoids any tendency to spread or split the stem. The curved cutting edges necessitate the provision of material extending to the point marked 24 and this material provides the necessary strength. Moreover the rock tends to exert an inward force on the cutting edges in this region.

I claim:

1. A hard metal rock drilling bit comprising a number of V-sectioned wings such that the V form is, in axial view, radial to the axis of the bit and the edges of the V's form cutting edges disposed for breaking rock by axially applied percussion, all of said wings extending from the periphery of the bit towards the centre, certain of them terminating short of the centre and others continuing to the centre, those portions of said edges which are close to the axis being substantially perpendicular thereto, and the edges curved substantially continuously rearwardly to the axis as they become distant therefrom.

2. A hard metal rock drilling bit comprising a number of V-sectioned wings the edges of which are substantially radial in axial view and disposed for breaking rock by axially applied percussion, all the edges being similarly and substantially continuously curved backward away from the axis and towards the periphery and so that at their rearward termination their angle to the axis is the minimum consistent with avoiding jamming of said edges in the hole, the number of such edges being so increased towards the periphery as to equalize the cutting burden per unit length of edge in the outer and inner areas of the bit.

3. A hard metal rock drilling bit comprising a number of V-sectioned wings the edges of which are substantially radial in axial view and disposed for breaking rock by axially applied percussion, all the edges being similarly and substantially continuously curved backward away from the axis and the number of such edges being increased towards the periphery so that in an annular area towards the periphery, of a given radial width, the total length of the edges contained therein is increased relatively to the total length of the edges contained within an annular area towards the centre and of equal radial width, proportionately to the mean diameters of said areas.

4. A hard metal rock drilling bit comprising a number of V-sectioned wings the edges of which are radial in axial view and disposed for breaking rock by axially applied percussion, the number of edges increasing from the centre towards the periphery and being not fewer than six at the periphery, the edges being substantially normal to the axis at the centre and all the edges substantially continuously curving backwards towards the periphery so that at the periphery their angle to the axis is between 11 and 30 degrees.

5. A hard metal rock drilling bit having an axial hole for delivering water to make sludge, said bit comprising a number of V-sectioned wings the edges of which are substantially radial in axial view and disposed for breaking rock by axially applied percussion, all the edges being similarly and substantially continuously curved backward away from the axis and the number of such edges being increased towards the periphery so as to be the maximum consistent with their leaving between them passages of adequate area for the escape of sludge comprising the water delivered by the axial hole.

JOSEPH ROBBINS CURTIS.